United States Patent [19]

Horwitz et al.

[11] 3,751,791

[45] Aug. 14, 1973

[54] METHOD FOR MOUNTING A PANEL METER

[75] Inventors: Joshua Horwitz; Bernard M. Gordon, both of Magnolia; Brant W. Becker, Sudbury, all of Mass.

[73] Assignee: Gorclan Engineering Company, Wakefield, Mass.

[22] Filed: Mar. 17, 1971

[21] Appl. No.: 125,215

Related U.S. Application Data

[62] Division of Ser. No. 852,808, Aug. 25, 1969, abandoned.

[52] U.S. Cl. .......................... 29/469, 29/526, 248/27, 317/104

[51] Int. Cl. .......................... B23p 21/00

[58] Field of Search .......................... 29/526, 428, 469; 248/27; 317/104

[56] References Cited

UNITED STATES PATENTS

| | | | |
|---|---|---|---|
| 1,724,520 | 8/1929 | Schlaich | 248/27 X |
| 1,735,904 | 11/1929 | Keeney | 248/27 X |
| 1,800,572 | 4/1931 | Simonsen | 248/27 |
| 1,803,211 | 4/1931 | Schlaich | 248/27 X |
| 1,808,198 | 6/1931 | Zubaty | 248/27 X |
| 3,570,108 | 3/1971 | Sarra | 29/469 |

*Primary Examiner*—Charlie T. Moon
*Attorney*—Joseph Weingarten, Laurence A. Marham and Stanley M. Schurgin

[57] ABSTRACT

In a bipolar floating input device, particularly for dual-slope integration digital panel meters, an analog voltage is applied to a bipolar floating input circuit and a digital form of the analog voltage is presented by a display.

4 Claims, 6 Drawing Figures

INVENTORS
JOSHUA HORWITZ
BERNARD M. GORDON
BRANT W. BECKER
BY Morse, Altman & Oates
ATTORNEYS INVENTORS
JOSHUA HORWITZ
BERNARD M. GORDON
BRANT W. BECKER
BY Morse, Altman & Oates
ATTORNEYS INVENTORS
JOSHUA HORWITZ
BERNARD M. GORDON
BRANT W. BECKER
BY Morse, Altman & Oates
ATTORNEYS INVENTORS
JOSHUA HORWITZ
BERNARD M. GORDON
BRANT W. BECKER
BY Morse, Altman & Oates
ATTORNEYS

METHOD FOR MOUNTING A PANEL METER

CROSS REFERENCE TO RELATED APPLICATION

This is a division of U.S. Pat. application Ser. No. 852,808, filed Aug. 25, 1969, now abandoned.

BACKGROUND AND SUMMARY

The present invention relates to panel meters, and more particularly to bipolar digital panel meters employing a dual-slope integration technique for converting analog data to digital form. In the dual-slope integration technique, analog to digital conversion is accomplished by applying a current proportional to an input analog voltage to a discharged capacitor for a predetermined sampling time, i.e., a predetermined number of clock pulses, and causing a charge to build up across the capacitor. After the sampling time interval, a reference current is applied to the charged capacitor in order to discharge the capacitor. A digital coded form of the analog input is specified as the number of clock pulses recorded in the time interval from completion of the sampling time until the capacitor is discharged to its reference condition. The digital coded form is decoded for presentation in numerical form by a display. Prior bipolar digital panel meters have been undesirably expensive and cumbersome.

A primary object of the present invention is to provide, particularly for digital panel meters, a novel bipolar floating input technique characterized by first and second drive amplifiers through which a current flows, first and second operational amplifiers for receiving a bipolar analog input and for controlling the conduction state of the first and second drive amplifiers, respectively, and a resistor connected serially between an inverting input of the first operational amplifier and an inverting input of the second operational amplifier, through which a current flows from the first drive amplifier to an output of the second operational amplifier and from the second drive amplifier to an output of the first drive amplifier. The combination of drive amplifiers, operational amplifiers and resistor is such as to provide a precise, reliable, inexpensive and compact bipolar digital panel meter.

Another object of the present invention is to provide, particularly for digital panel meters, an overload blanking circuit characterized by a logic configuration for providing a blanking signal to a numerical display, a "C" flip-flop for providing a first signal to the logic circuit, and a "K" flip-flop for providing a second signal to the logic circuit, whereby the display is blanked in an overload condition, i.e., the magnitude of the input analog signal exceeds the magnitude of the digital signal which the display is capable of presenting.

A further object of the present invention is to provide a novel panel meter front mounting technique characterized by a panel meter chassis having a housing wherein the panel meter components are generally mounted by conventional means, a faceplate which forms a lip, and a U-shaped bracket affixed to the rear of the panel meter and in juxtaposition with the sides of the panel meter chassis. The lip and bracket cooperate in such a manner as to fasten securely the panel meter chassis within an aperture of a panel, by the vise-like action of the lip and bracket.

The invention accordingly comprises the apparatus possessing the construction, combination of elements, and arrangement of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description, taken in connection with the accompanying drawings wherein.

DETAILED DESCRIPTION

Figure 1:
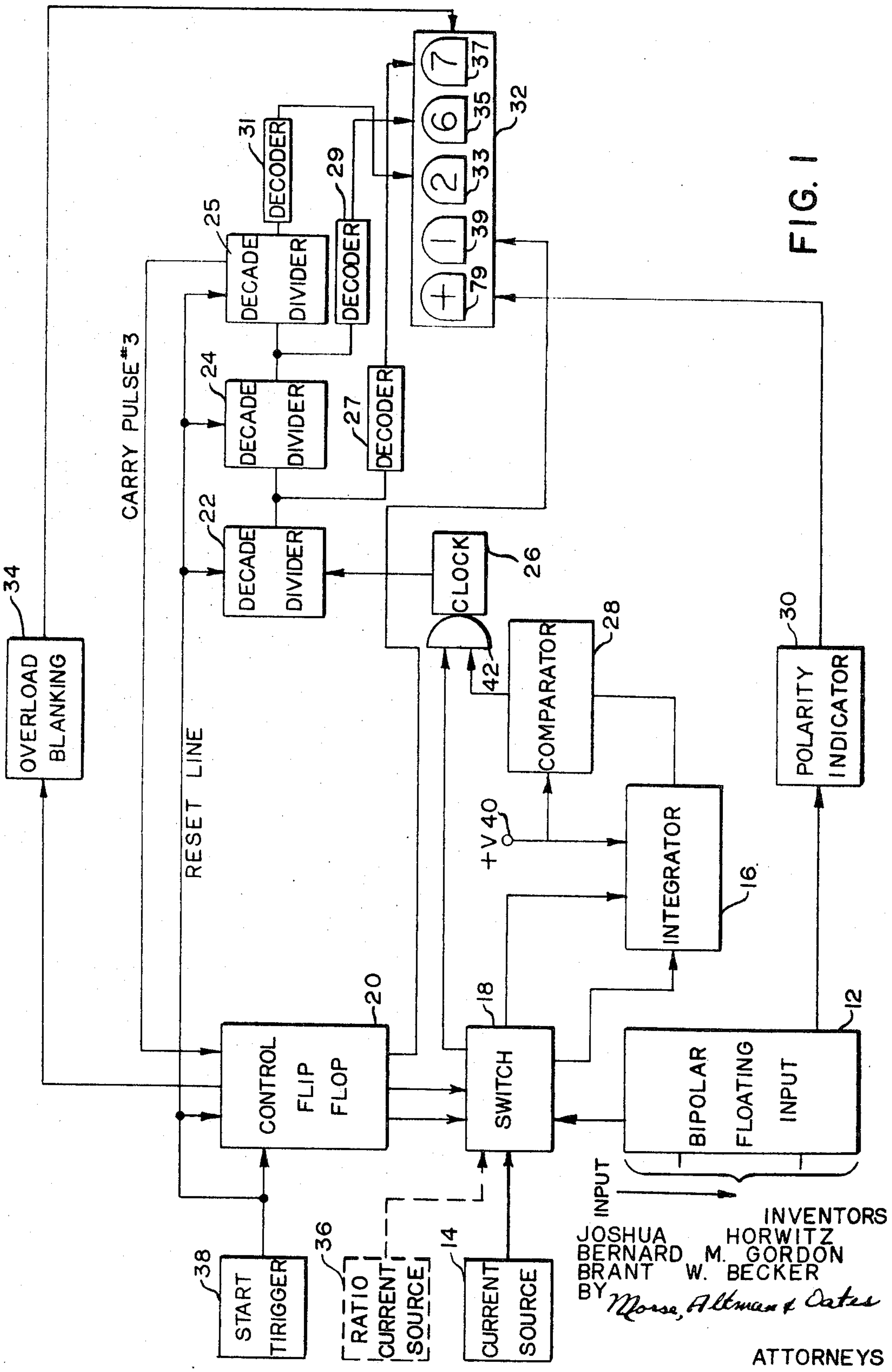
FIG. 1 is a block diagram, somewhat schematic, of a bipolar digital panel meter embodying the present invention.

Generally, the panel meter of FIG. 1 comprises a bipolar floating input 12 for receiving an input analog voltage, a current source 14 for generating a precision current, an integrator 16 for integrating a current from bipolar floating input 12 and the current from current source 14, a switch 18 for controlling the current being integrated in integrator 16, a control flip-flop 20 for controlling switch 18, decade dividers 22, 24, and 25 for supervising control flip-flop 20 and for providing output registers, a clock 26 for providing clock pulses to decade divider 22, a comparator 28 for controlling clock 26, a polarity sensor 30 for sensing the polarity of the input analog voltage, a plurality of decoders 27, 29, and 31 for decoding a digital signal in decade dividers 22, 24, and 25 respectively, a display 32 for presenting the input analog voltage in numerical form, and an overload blanking 34 for blanking display 32 in an overload condition. In a modified embodiment a ratio current source 36 is employed and the digital form, as presented by display 32, is a multiple or a fraction of the input analog signal.

In the device of FIG. 1, analog to digital conversion is initiated by a reset trigger which is generated from start trigger 38. Control flip-flop 20, decade dividers 22, 24, and 25 are set to a zero state. A voltage 40 is applied to integrator 16 which is charged to voltage 40. An input analog signal is applied to bipolar floating input 12. A discharge current flows from integrator 16 to the bipolar floating input 12 via switch 18, whereby the integrator is discharged. The discharge rate of integrator 16 is specified by the amplitude of the analog voltage and the discharge time is specified by a predetermined number of clock pulses from clock 26. For every tenth clock pulse applied to decade divider 22, a carry pulse 1 from decade divider 22 is applied to decade divider 24. For every tenth carry pulse 1 which is applied to decade divider 24, a carry pulse 2 from decade divider 24 is applied to decade divider 25. For every tenth carry pulse 2 which is applied to decade divider 25, a carry pulse 3 from decade divider 25 is applied to control flip-flop 20. Carry pulse 3 triggers control flip-flop 20 to a first state and causes switch 18 to assume a second state. When switch 18 is in the second state, the discharge current is prevented from flowing and a charging current from current source 14 is applied to integrator 16 via switch 18. Integrator 16 is charged to voltage 40 and an output pulse from comparator 28 is applied to a logic circuit 42 to stop clock 26. The number of clock pulses, which were generated by clock 26 while integrator 16 was charged to voltage 40, are recorded by decade dividers 22, 24, and 25. A digital output from decade dividers 22, 24, and 25 is applied to decoders 27, 29, and 31, respectively, for decoding. The decoded signal from decoders 27, 29, and 31 is applied to numerical indicators 33, 35, and 37, respectively. When a second carry pulse 3 is applied by decade divider 25 to control flip-flop 20, a signal from control flip-flop 20 causes a "1" to appear on a numerical indicator 39. The magnitude of the analog input is represented by the numerals which are displayed on numerical indicators 39, 33, 35, and 37. It will be understood that, in alternative embodiments, the number of numerical indicators is other than four, for example, five. Polarity sensor 30 and overload blanking 34 now will be described in connection with FIG. 2.

Figure 2:
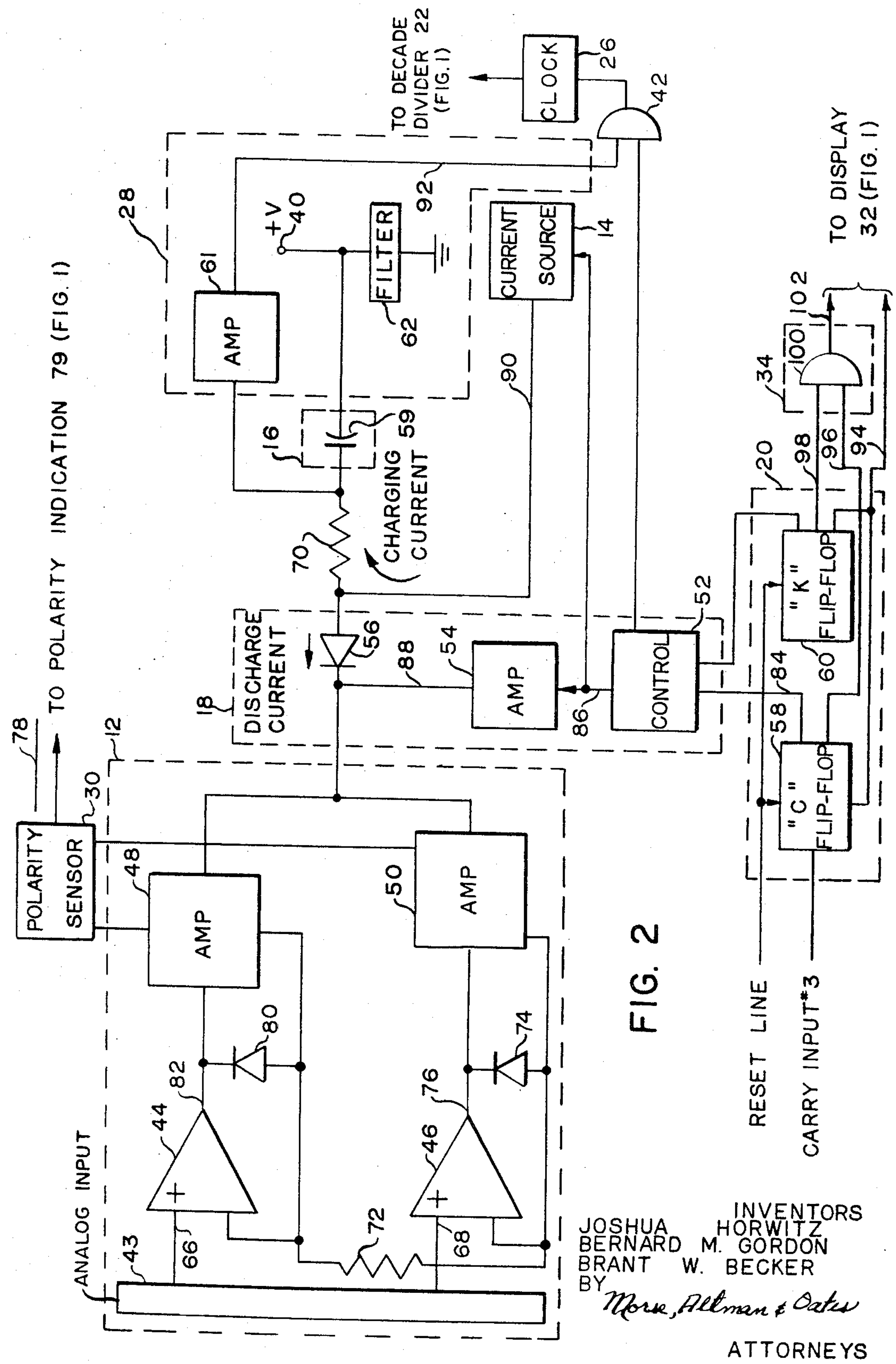
FIG. 2 is a block and schematic diagram of important details of FIG. 1.

FIG. 2 illustrates the details of bipolar floating input 12, current source 14, switch 18, comparator 28, and control flip-flop 20 of FIG. 1. In general, bipolar floating input 12 includes an input terminal 43 for receiving an analog input and two operational amplifiers 44 and 46 for controlling conduction of amplifiers 48 and 50, respectively. Generally, switch 18 includes a controller 52 for controlling the conduction of an amplifier 54 and a diode 56 for controlling the discharge current. Control flip flop 20 includes a "C" flip-flop 58 and a "K" flip-flop 60 for controlling clock 26, overload blanking 34 and control 52. Integrator 16 includes a capacitor 59 for integrating the analog input. In general, comparator 28 includes an amplifier 61 for controlling clock 26 and a filter 62 for filtering voltage 40.

In the bipolar floating input 12, a bipolar analog input is applied to inputs 66 and 68 of operational amplifiers 44 and 46 respectively. When the voltage as at 66 is positive with respect to the voltage as at 68, a positive output is applied by operational amplifier 44 to amplifier 48. When amplifier 48 conducts the discharge current flows from charged capacitor 59 (which has been charged to voltage 40), through a resistor 70, diode 56, amplifier 48, a resistor 72 and a diode 74 to an output 76 of operational amplifier 46. When amplifier 48 conducts, a large positive voltage 78 is generated by polarity sensor 30. Positive voltage 78 is applied to a polarity indicator 79 in display 32 and a "+" is presented on the polarity indicator (FIG. 1). When the voltage at 68 is positive with respect to the voltage at 66, a positive output is applied by operational amplifier 46 to amplifier 50. Amplifier 50 is energized in consequence of which a discharge current flows from charged capacitor 59 through resistor 70, diode 56, amplifier 50, resistor 72 and a diode 80 to an output 82 of operational amplifier 44. When amplifier 48 is not conducting, a small voltage is generated from polarity sensor 30 and a "—" is presented on polarity indicator 79. As previously stated in the description of FIG. 1, the discharge current continues to flow until carry pulse 3 is applied to control flip-flop 20. "C" flip-flop 58 is triggered into a state ONE by carry pulse 3 and an output 84 is applied to control 52 of switch 18. An output 86 from control 52 is applied to amplifier 54 and current source 14. A positive voltage 88 from amplifier 54 is applied to the cathode of diode 56 and the discharge current is prevented from flowing through diode 56. Output 86 is applied to current source 14 so that a charging current 90 is generated from current source 14. Charging current 90 is applied to capacitor 59 through resistor 70 so that a charge is built up across capacitor 59. When capacitor 59 is charged to the voltage 40, amplifier 61 is energized, an output 92 is applied to logic 42 and clock 26 is stopped. If a second carry pulse 3 is applied to "C" flip-flop 58, i.e., a second tenth carry pulse 2 is applied to decade divider 25, "C" flip-flop 58 is triggered to a state ZERO and "K" flip-flop 60 is triggered to a state ONE. In consequence, output 94 is applied to numerical indicator 39 in display 32 and a "1" is presented on numerical indicator 39 (FIG. 1). If a third carry pulse 3 is applied to "C" flip-flop 58, i.e., a third tenth carry pulse 2 is applied to decade divider 25, "C" flip-flop 58 is triggered to state ONE. If "C" flip-flop 58 is triggered to state ONE when "K" flip-flop 60 is in state ONE, signals 96 and 98 are applied to a logic circuit 100 in overload blanking 34. An output 102 is applied by overload blanking 34 to display 32, whereby no numerals are presented by display 32.

Figure 3:
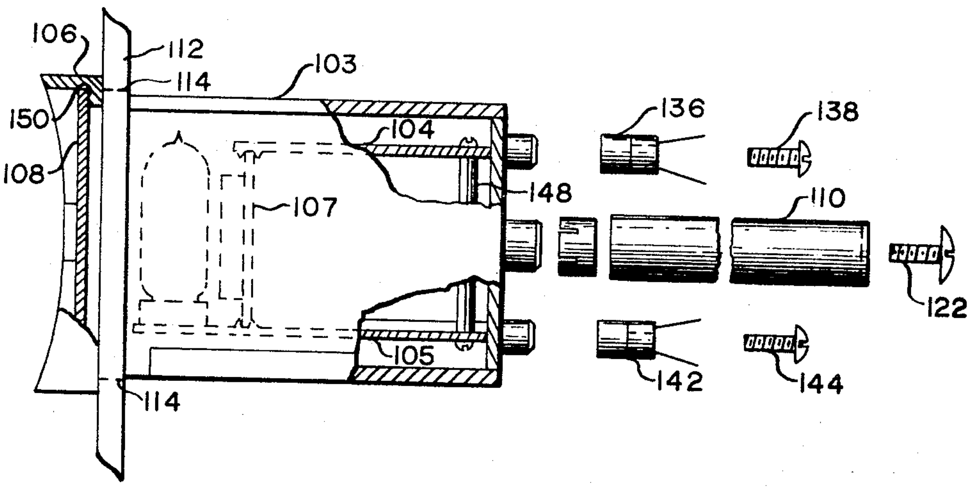
FIG. 3 is a side elevation, partly broken away, of the panel meter of FIG. 1.
Figure 4:
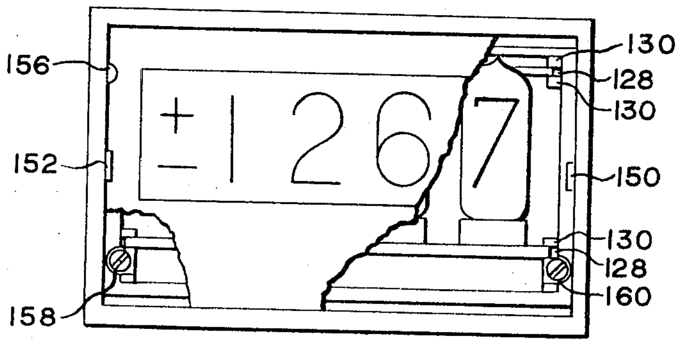
FIG. 4 is a front elevation, partly broken away, of FIG. 3.
Figure 5:
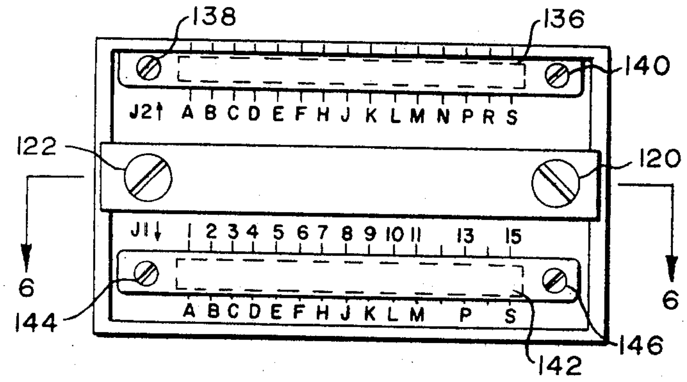
FIG. 5 is a rear elevation of FIG. 3.

FIG. 3, FIG. 4, and FIG. 5 illustrate a front panel and circuit board panel meter mounting techniques, which are characteristic of the panel meter of FIG. 1, in accordance with the present invention. Generally, the panel meter assembly comprises a chassis 103, wherein the components of FIG. 1 are generally mounted by conventional means on circuit boards 104, 105, and 107, a rim 106 extending circumferentially about a forward edge of chassis 103, a shield 108 which is removably seated in rim 106, a U-shaped bracket 110 which is provided for mounting chassis 103 in a panel 112.

Figure 6:
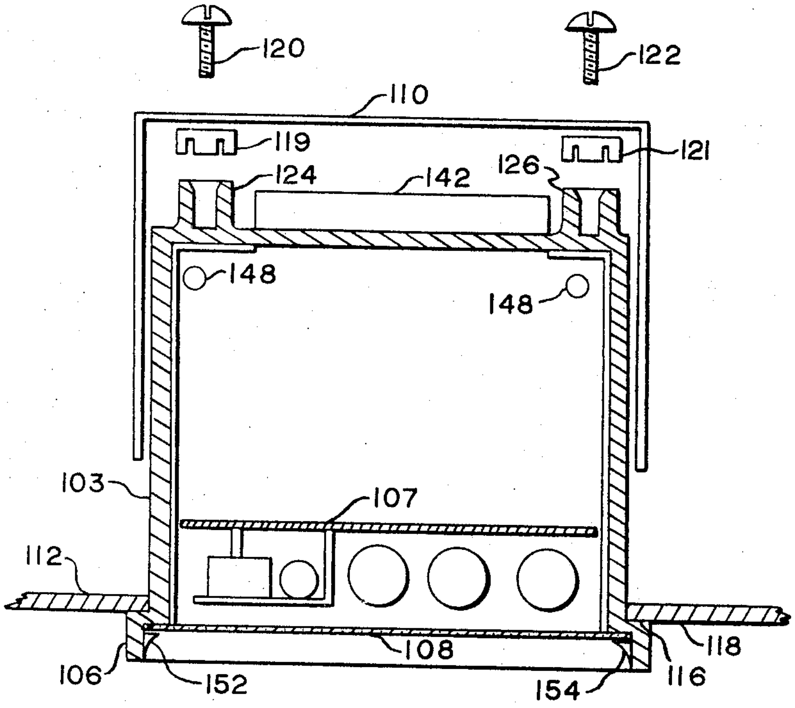
FIG. 6 is a section, taken along 6—6 of FIG. 5.

Details of the panel meter assembly front mounting technique are shown in FIG. 6. Generally, chassis 103 is received in an opening 114 of panel 112. Opening 114 is smaller than rim 106 and slightly larger than chassis 103. Rim 106 has a rearward facet 116, which is adapted to abut against the front face 118 of panel 112. Pressed nuts 119 and 121 are affixed firmly to bosses 124 and 126, respectively, and U-shaped bracket 110 is affixed to chassis 103 with fasteners, for example, screws 120 and 122. As screws 120 and 122 are threaded into bosses 124 and 126 respectively, bracket 110 is firmly pressed against panel 112. The panel meter assembly is securely fastened in panel 112 by the vise-like action of bracket 110 and rearward facet 116 on panel 112. Removal of the panel meter assembly is accomplished simply by removing screws 120 and 122 from bosses 124 and 126 respectively, and pulling chassis 103 forwardly through opening 114.

A clear understanding of the circuit board front mounting technique will be facilitated by a consideration of FIGS. 3, 4, 5, and 6. Generally, chassis 103 is provided with a plurality of parallel guides 128 formed by a plurality of ribs 103. Circuit boards 104 and 105 are removably seated in the parallel guides. Circuit board 103 is inserted into a jack 136, which is affixed to the rear of chassis 103 by fasteners, for example, screws 138 and 140. Circuit board 105 is inserted into a jack 142, which is affixed to the rear of chassis 103 by fasteners, for example, screws 144 and 146. Circuit boards 104 and 105 are held firmly apart by a plurality of spacer bars 148, whose ends are affixed to each of the circuit boards in such a manner that both circuit boards are inserted and removed as a unit. After circuit board 107 is inserted into chassis 103 and is affixed thereto by fasteners, for example, screws 158 and 160, shield 108 is removably inserted into a forward facet 150 of rim 106. Shield 108, which is composed of translucent plastic is sufficiently flexible to be removed readily but sufficiently rigid to be retained securely by fasteners 152 and 154. Shield 108 is provided with a notch 156, which facilitates removal of the shield. Removal of circuit boards 104 and 105 is accomplished by simply removing shield 108 and pulling the circuits boards away from jacks 136 and 142 and out of parallel guides 128.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A method of mounting a panel meter to a panel formed with a substantially rectangular aperture, said panel meter including a chassis in the form of a closed housing opened at a forward face thereof and formed with a rim extending about said forward face of said housing, said housing and said rim having a profile corresponding to the profile of said aperture, said housing dimensionally smaller than said aperture, said rim dimensionally larger than said aperture, said housing having a pair of bosses extending outwardly and rearwardly from a rearward face thereof, comprising the steps of inserting said chassis into said aperture, abutting a rearward face of said rim against a forward face of said panel, said housing projecting rearwardly through said aperture, pressing nut means to each of said bosses, one of each said nut means secured to one of each said bosses, positioning a U-shaped bracket formed with a pair of holes, one of each said holes in registration with one of each said nut means, securing said bracket to said housing by inserting a screw into each said hole and threading each said screw into each said nut means, said bracket having a pair of legs extending along opposite sidewalls of said housing, engaging a rearward face of said panel by said legs as said screws are threaded into said nut means, rigidly securing said panel meter to said panel by a vise-like action of said legs on said rearward face of said panel and said rearward face of said rim on said forward face of said panel.

2. The method of mounting a panel meter to a panel as claimed in claim 1 including the step of inserting a shield into said rim, said rim formed with fastening means, said shield composed of a translucent plastic sufficiently flexible to be readily removed from said rim and sufficiently rigid to be retained by said fastening means.

3. The method of mounting a panel meter to a panel as claimed in claim 1 including the step of affixing jack means to said rearward face of said housing, said panel meter having electrical components mounted therein on circuit board means, said circuit board means slidably mounted to said housing, said housing formed with an opening in said rearward face thereof in registration with said circuit board means, said jack means engaging said circuit board means and providing an electrical connection thereto.

4. The method of mounting a panel meter to a panel as claimed in claim 3 including the steps of inserting a shield into said rim, said rim formed with fastening means, said shield composed of a translucent plastic sufficiently flexible to be readily removed from said rim and sufficiently rigid to be retained by said fastening means.

* * * * *